(12) United States Patent
Wild et al.

(10) Patent No.: US 11,178,675 B2
(45) Date of Patent: Nov. 16, 2021

(54) APPARATUSES, METHODS AND COMPUTER PROGRAMS FOR A MOBILE COMMUNICATION SYSTEM COMPRISING A BASE STATION TRANSCEIVER AND A MOBILE TRANSCEIVER

(71) Applicant: Alcatel Lucent, Boulogne Billancourt (FR)

(72) Inventors: Thorsten Wild, Stuttgart (DE); Danish Aziz, Stuttgart (DE); Frank Schaich, Stuttgart (DE); Paulo Baracca, Stuttgart (DE); Andre Fonseca Dos Santos, The Hague (NL)

(73) Assignee: Alcatel Lucent, Nozay (FR)

( * ) Notice: Subject to any disclaimer, the term of this patent is extended or adjusted under 35 U.S.C. 154(b) by 627 days.

(21) Appl. No.: 15/512,904

(22) PCT Filed: Aug. 7, 2015

(86) PCT No.: PCT/EP2015/068238
§ 371 (c)(1),
(2) Date: Mar. 21, 2017

(87) PCT Pub. No.: WO2016/045861
PCT Pub. Date: Mar. 31, 2016

(65) Prior Publication Data
US 2017/0245297 A1 Aug. 24, 2017

(30) Foreign Application Priority Data

Sep. 24, 2014 (EP) .................................. 14306467

(51) Int. Cl.
*H04W 72/12* (2009.01)
*H04W 74/02* (2009.01)
(Continued)

(52) U.S. Cl.
CPC ....... *H04W 72/1231* (2013.01); *H04L 1/0041* (2013.01); *H04L 5/006* (2013.01);
(Continued)

(58) Field of Classification Search
CPC ......... H04W 72/1231; H04W 72/1242; H04W 74/02
See application file for complete search history.

(56) References Cited

U.S. PATENT DOCUMENTS 6,798,838 B1 9/2004 Ngo
8,625,442 B2 1/2014 Ratasuk et al.
(Continued)

FOREIGN PATENT DOCUMENTS

CN 101406097 A 4/2009
CN 103597894 A 2/2014
(Continued)

OTHER PUBLICATIONS

PCT Pat. App. No. PCT/EP2015/068238, Written Opinion of the International Searching Authority, dated Oct. 9, 2015, 8 pp.
(Continued)

*Primary Examiner* — Ronald B Abelson
(74) *Attorney, Agent, or Firm* — Fay Sharpe LLP (57) ABSTRACT

Embodiments provide apparatuses, methods and computer programs for mobile communication systems comprising base station and mobile transceivers. An apparatus for a base station transceiver (and/or a mobile transceiver) of a mobile communication system, comprises a transceiver module to communicate with the mobile transceiver (and/or base station transceiver) using first and second communication channels, wherein the first channel is more reliable than the second channel. The apparatus further comprises a controller module to control the transceiver module, and to provide a data service to the mobile transceiver (and/or base station (Continued)

transceiver). The data service comprises first and second data packets, wherein the first data packets comprise information related to core data of the data service, and wherein the second data packets comprise information related to optional refinement data for the data service. The first data packets use the first channel, and the second data packets use the second channel.

20 Claims, 4 Drawing Sheets

(51) Int. Cl.
*H04L 5/00* (2006.01)
*H04L 1/00* (2006.01)
*H04L 29/06* (2006.01)
*H04W 88/08* (2009.01)
*H04W 88/12* (2009.01)

(52) U.S. Cl.
CPC ..... *H04L 65/4069* (2013.01); *H04W 72/1242* (2013.01); *H04W 74/02* (2013.01); *H04L 2001/0096* (2013.01); *H04W 88/08* (2013.01); *H04W 88/12* (2013.01)

(56) References Cited

U.S. PATENT DOCUMENTS

| | | | |
|---|---|---|---|
| 2003/0009576 A1 | 1/2003 | Apostolopoulos et al. | |
| 2004/0016000 A1* | 1/2004 | Zhang | H04N 7/16 |
| 2004/0037286 A1* | 2/2004 | Huang | H04L 12/28 |
| 2007/0201369 A1 | 8/2007 | Pedersen et al. | |
| 2008/0022325 A1* | 1/2008 | Ober | H04N 7/16 |
| 2008/0051098 A1 | 2/2008 | Rao | |
| 2009/0122807 A1* | 5/2009 | Yoshizawa | H04J 3/00 |
| 2009/0147876 A1* | 6/2009 | Ouyang | H04B 7/0417 |
| | | | 375/267 |
| 2010/0224725 A1* | 9/2010 | Perlman | B60K 6/46 |
| | | | 244/1 R |
| 2010/0322152 A1* | 12/2010 | Chen | H04N 19/61 |
| | | | 370/328 |
| 2012/0182977 A1 | 7/2012 | Hooli et al. | |
| 2012/0287855 A1 | 11/2012 | Kishigami et al. | |
| 2013/0329694 A1 | 12/2013 | Vrzic et al. | |
| 2014/0106770 A1 | 4/2014 | Valentin et al. | |
| 2014/0328183 A1* | 11/2014 | Au | H04W 28/0284 |
| | | | 370/237 |
| 2015/0131449 A1* | 5/2015 | Kojima | H04W 28/08 |
| 2015/0365332 A1* | 12/2015 | You | H04L 47/30 |

FOREIGN PATENT DOCUMENTS

| | | |
|---|---|---|
| EP | 2 590 349 A1 | 5/2013 |
| JP | 2003525546 A | 8/2003 |
| JP | 2005508584 A | 3/2005 |
| JP | 2008085378 A | 4/2008 |
| WO | WO 01/65848 A1 | 9/2001 |
| WO | WO 2006/054249 A1 | 5/2006 |
| WO | 2011093074 A1 | 8/2011 |

OTHER PUBLICATIONS

European Pat. App. No. 14306467.3, Extended European Search Report, dated Feb. 11, 2015, 8 pp.
English Bibliography for Japanese Patent Application Publication No. JP2003525546A; published Aug. 26, 2003 printed from Derwent Innovation on Aug. 20, 2018; 4 pp.
English Bibliography for Japanese Patent Application Publication No. JP2008085378A; published Apr. 10, 2008; printed from Derwent Innovation on Aug. 20, 2018; 4 pp.
English Bibliography for Japanese Patent Application Publication No. JP2005508584A; published Mar. 31, 2005; printed from Derwent Innovation on Aug. 20, 2018; 5 pp.
English Bibliography for PCT Patent Application Publication No. WO2011093074A1; published Aug. 4, 2011; printed from Derwent Innovation on Aug. 20, 2018; 4 pp.
English Bibliography of Chinese Patent Publication No. CN101406097A, Published Apr. 8, 2009, Printed from Derwent Innovation on Jul. 11, 2019, 4 pages.
English Bibliography of Chinese Patent Publication No. CN103597894A, Published Feb. 19, 2014, Printed from Derwent Innovation on Jul. 11, 2019, 6 pages.
International Search Report for PCT/EP2015/068238 dated Oct. 9, 2015.

* cited by examiner

APPARATUSES, METHODS AND COMPUTER PROGRAMS FOR A MOBILE COMMUNICATION SYSTEM COMPRISING A BASE STATION TRANSCEIVER AND A MOBILE TRANSCEIVER

TECHNICAL FIELD

Embodiments relate to apparatuses, methods and computer programs to communicate in a mobile communication system comprising a base station transceiver and a mobile transceiver, more particularly but not exclusively, to using two or more communication channels of different reliability to transmit non-optional core data and optional refinement data.

BACKGROUND

This section introduces aspects that may be helpful in facilitating a better understanding of the invention(s). Accordingly, the statements of this section are to be read in this light and are not to be understood as admissions about what is in the prior art or what is not in the prior art.

Demands for higher data rates for mobile services are steadily increasing. At the same time modern mobile communication systems as 3rd Generation systems (3G) and 4th Generation systems (4G) provide enhanced technologies, which enable higher spectral efficiencies and allow for higher data rates and cell capacities. The demands are growing for both directions of transmission, in the DownLink (DL) for transmission from the network infrastructure to a mobile transceiver, as well as in the UpLink (UL) for transmission from a mobile transceiver to the network infrastructure.

To further increase the bandwidth available in the system and improve the utilization of the channels, novel approaches are being introduced which utilize different kinds of communication channels to boost the system performance, reduce delays or add additional layers of fault tolerance.

Wireless communication makes use of a number of heterogeneous channels, some of which provide some degree of reliability, such as controlled channels, which are assigned to mobile transceivers by a base station, while others provide contention-based, random and less reliable access.

Further details can be found in
U.S. Pat. No. 8,625,442 B2,
US 20080051098 A1,
US 20120182977 A1,
Wunder, G.; Jung, P.; Kasparick, M.; Wild, T.; Schaich, F.; Chen, Y.; Brink, S. T. et. al. "5GNOW: non-orthogonal, asynchronous waveforms for future mobile applications," *Communications Magazine, IEEE*, vol. 52, no. 2, pp. 97-105, February 2014, M. Trivellato, F. Boccardi, and H. Huang, "On Transceiver Design and Channel Quantization for Downlink Multiuser MIMO Systems with Limited Feedback", IEEE Trans. Commun., vol. 26, no. 8, pp. 1494-1504, October 2008, M. Draexler, J. Blobel, P. Dreimann, S. Valentin, H. Karl "Anticipatory Buffer Control and Quality Selection for Wireless Video Streaming", arXiv:1309.5491 [cs.NI], September 2013, (Online), and S. Sadr and S. Valentin, "Anticipatory Buffer Control and Resource Allocation for Wireless Video Streaming", arXiv: 1304.3056 [cs.MM], April 2013.

SUMMARY OF ILLUSTRATIVE EMBODIMENTS

Some simplifications may be made in the following summary, which is intended to highlight and introduce some aspects of the various exemplary embodiments, but such simplifications are not intended to limit the scope of the invention(s). Detailed descriptions of a preferred exemplary embodiment adequate to allow those of ordinary skill in the art to make and use the inventive concepts will follow in later sections.

Various embodiments provide apparatuses, methods and computer programs for mobile communication systems comprising base station transceivers and mobile transceivers. Current mobile communication systems, such as, but not limited to, Long Term Evolution (LTE) or Universal Mobile Telecommunication System (UMTS) utilize a number of different channels, which vary in bandwidth, mode of operation and relative reliability, for a communication between a base station transceiver and a mobile transceiver. These channels, which include, but are not limited to, control channels, transmission channels, and broadcast channels, for both uplink (transmission from mobile transceiver to base station transceiver) and downlink directions (transmission from base station transceiver to mobile transceiver), may use different modes of operations: Some are schedule-based, allowing participants access at pre-determined intervals in a packet switched manner, others are used based on assignment by a base station in a circuit switched manner, and yet others are contention based, allowing all participants access at any time, with the risk of mutual interference or collision. Embodiments, for example apparatuses for base station transceivers and/or mobile transceivers, combine channels with different relative reliability and may allow a more efficient utilization of the available resources based on the data that is transmitted. Making use of a combination of such channels may improve or maximize performance of mobile communication systems.

Embodiments provide an apparatus for a base station transceiver of a mobile communication system. The mobile communication system further comprises a mobile transceiver. The base station transceiver apparatus comprises a transceiver module to communicate with the mobile transceiver using at least a first communication channel and a second communication channel. The first communication channel is more reliable than the second communication channel. The base station transceiver apparatus further comprises a controller module to control the transceiver module and to provide a data service to the mobile transceiver. The data service comprises first and second data packets, wherein the first data packets comprise information related to core data of the data service, and wherein the second data packets comprise information related to optional refinement data for the data service. The first data packets use the first communication channel and the second data packets use the second communication channel. Embodiments further provide an apparatus for a mobile transceiver of a mobile communication system. The mobile communication system further comprises a base station transceiver. The mobile transceiver apparatus comprises a transceiver module to communicate with the base station transceiver using at least a first communication channel and a second communication channel. The mobile transceiver apparatus further comprises a controller module to control the transceiver module, and to provide a data service to the base station transceiver. The data service comprises first and second data packets, wherein the first data packets comprise information related to core data of the data service, and wherein the second data packets comprise information related to optional refinement data for the data service. The first data packets use the first communication channel, and the second data packets use the second communication channel.

For the following embodiments, all embodiments providing communication from the base station transceiver to the mobile transceiver may also be adapted for communication from the mobile transceiver to the base station transceiver, and vice versa, and are not mutually exclusive. In other words, the following description refers to uplink transmission, to downlink transmission and/or to both. In embodiments the respective transmitter may use the first communication channel for transmission the first data packets and the second communication channel for transmission of the second data packets. The respective receiver may then receive the first and second communication channels and combine the first and second data packets if a reception quality allows for such combination. The controller and transceiver modules on the transmitter and receiver sides are then configured accordingly, which may be at the base station transceiver and/or at the mobile transceiver.

In embodiments the first channel may be relatively reliable, and the second channel may be relatively unreliable, e.g. contention based. The reliable (first) channel may be used to transmit core data (as first data packets) between the base station transceiver and the mobile transceiver, while the less-reliable (second) channel may be used to provide optional refinement data (as second data packets), without adding to the amount of data transmitted on the reliable (first) channel between the base station transceiver and the mobile transceiver. Embodiments may provide an increased transmission efficiency by taking advantage of the second, less reliable, communication channel using refinement data.

The controller module at the base station transceiver apparatus may be configured to transmit the first and second data packets to the mobile transceiver, likewise at the mobile transceiver apparatus to transmit the first and second data packets to the base station transceiver. The controller module may be configured to communicate the second data packets when a channel quality indicator for the second communication channel indicates a communication quality above a threshold. Embodiments may improve the system efficiency by using the second communication channel when a channel quality of the second communication channel is sufficient to achieve a certain quality of service. Embodiments may avoid using the second communication channel when a channel quality on the second communication channel is insufficient to achieve the certain quality of service. Embodiments may avoid utilization of a contention-based resource when the channel quality does not permit usage with a certain quality of service.

In some embodiments the controller module may be configured to receive the first and second data packets from the mobile transceiver, the base station transceiver respectively. The controller module may be configured to combine the first and second data packets received from the mobile transceiver (base station transceiver) when a reception quality on the second communication channel lies above a threshold. Embodiments may enable enhanced service quality when refinement data can be received on the second communication channel.

In some embodiments the control module is configured to provide the data service, wherein the data service corresponds to a scalable video data service. The first data packets may comprise information related to basic video data, and the second data packets may comprise information related to enhancement video data. Some embodiments may provide a reliable basic video stream and a higher quality stream if the second communication channel permits.

Additionally or alternatively, in embodiments the first data packets may comprise information related to payload data, and the second data packets may comprise information related to channel state information of the first communication channel. Embodiments may allow provision of additional channel state information using the second communication channel. The additional channel state information on the second communication channel may allow to make more efficient use of available radio resource and to enhance system capacity.

Furthermore, in some embodiments the controller module is configured to communicate the second data packets when a traffic volume on the second data channel is below a threshold. Embodiments may enable utilization of the second communication channel when the system load permits. In further embodiments the controller module may be configured to communicate the second data packets when a channel priority level indicator for the second communication channel allows transmission of data packet with the priority indicator. Embodiments may allow to control transmission on the second communication channel by means of a priority scale. Based on the priority scale a control mechanism for data packets of different priorities may be implemented such that data packets having a lower priority may not be transmitted on the second communication channel under some conditions, for example, high load conditions of the system, avoiding an overutilization on the second communication channel.

Also, in some embodiments, the second communication channel may be a contention based communication channel, and/or the first communication channel may be a scheduled communication channel, for example, using the communication channels that may be available in or provided by a mobile communication system.

Embodiments further provide a method for a base station transceiver of a mobile communication system further comprising a mobile transceiver, for providing a data service to the mobile transceiver. The data service comprises first and second data packets, wherein the first data packets comprise information related to core data of the data service, and wherein the second data packets comprise information related to optional refinement data for the data service. The method also comprises communicating with the mobile transceiver the first data packets using a first communication channel as well as communicating with the mobile transceiver the second data packets using a second communication channel. The first communication channel is more reliable than the second communication channel.

Embodiments further provide a method for a mobile transceiver of a mobile communication system further comprising a base station transceiver, for providing a data service to the base station transceiver. The data service comprises first and second data packets, wherein the first data packets comprise information related to core data of the data service, and wherein the second data packets comprise information related to optional refinement data for the data service. The method also comprises communicating with the base station transceiver the first data packets using a first communication channel as well as communicating with the base station transceiver the second data packets using a second communication channel. The first communication channel is more reliable than the second communication channel.

Embodiments further provide a computer program having a program code for performing at least one of the above methods, when the computer program is executed on a computer, a processor, or a programmable hardware component. A further embodiment is a computer readable storage medium storing instructions which, when executed by a computer, processor, or programmable hardware component, cause the computer to implement one of the methods described herein.

BRIEF DESCRIPTION OF THE FIGURES

Some other features or aspects will be described using the following non-limiting embodiments of apparatuses or methods or computer programs or computer program products by way of example only, and with reference to the accompanying figures, in which.

DESCRIPTION OF EMBODIMENTS

Various example embodiments will now be described more fully with reference to the accompanying drawings in which some example embodiments are illustrated. In the figures, the thicknesses of lines, layers or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following some embodiments of apparatuses, methods and computer programs to communicate in a mobile communication system comprising a base station transceiver and a mobile transceiver, more particularly but not exclusively, to a system using two or more communication channels of different reliability to transmit non-optional core data and optional refinement data will be described.

In general, the mobile communication system may, for example, correspond to one of the Third Generation Partnership Project (3GPP)-standardized mobile communication networks, where the term mobile communication system is used synonymously to mobile communication network. The mobile or wireless communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A base station transceiver can be operable to communicate with one or more active mobile transceivers and a base station transceiver can be located in or adjacent to a coverage area of another base station transceiver, e.g. a macro cell base station transceiver or small cell base station transceiver. Hence, embodiments may provide a mobile communication system comprising one or more mobile transceivers and one or more base station transceivers, wherein the base station transceivers may establish macro cells or small cells, as e.g. pico-, metro-, or femto cells. A mobile transceiver may correspond to a smartphone, a cell phone, user equipment, radio equipment, a mobile, a mobile station, a laptop, a notebook, a personal computer, a Personal Digital Assistant (PDA), a Universal Serial Bus (USB)-stick, a car, a mobile relay transceiver for D2D communication, etc. A mobile transceiver may also be referred to as User Equipment (UE) or mobile in line with the 3GPP terminology.

A base station transceiver can be located in the fixed or stationary part of the network or system. A base station transceiver may correspond to a remote radio head, a transmission point, an access point, radio equipment, a macro cell, a small cell, a micro cell, a femto cell, a metro cell etc. A base station transceiver may correspond to a base station understood as a logical concept of a node/entity terminating a radio bearer or connectivity over the air interface between a terminal/mobile transceiver and a radio access network. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a transmission point, a relay transceiver etc., which may be further subdivided in a remote unit and a central unit.

A mobile transceiver can be associated, camped on, or registered with a base station transceiver or cell. The term cell refers to a coverage area of radio services provided by a base station transceiver, e.g. a NodeB (NB), an eNodeB (eNB), a remote radio head, a transmission point, etc. A base station transceiver may operate one or more cells on one or more frequency layers, in some embodiments a cell may correspond to a sector. For example, sectors can be achieved using sector antennas, which provide a characteristic for covering an angular section around a remote unit or base station transceiver. In some embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

Figure 1:
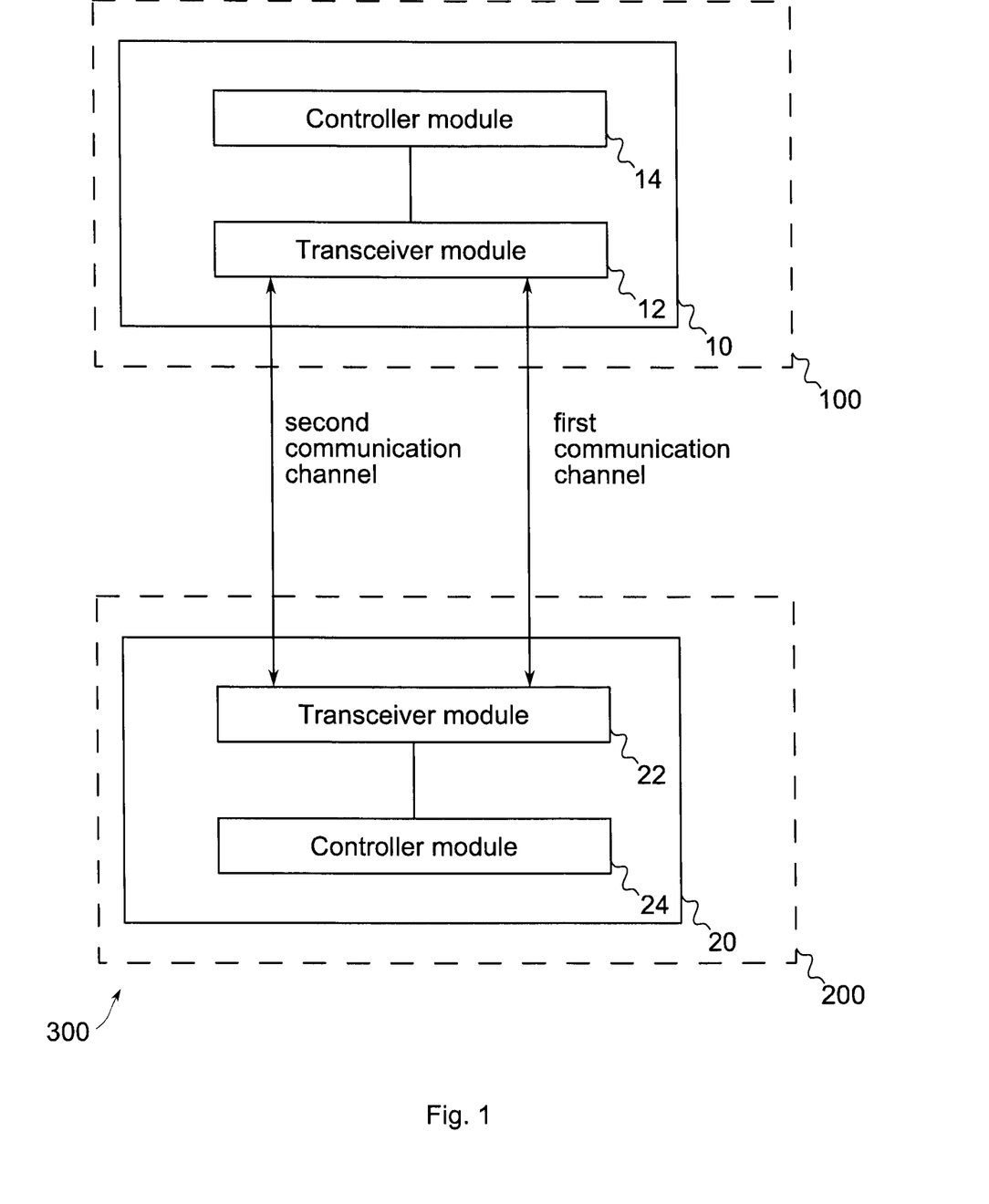
FIG. 1 illustrates a block diagram of an embodiment of an apparatus for a mobile transceiver and an apparatus for a base station transceiver.

FIG. 1 illustrates a block diagram of an embodiment of an apparatus 10 for a base station transceiver 100, to which it will be also referred to as base station transceiver apparatus 10, and an apparatus 20 for a mobile transceiver 200, to which it will be also referred to as mobile transceiver apparatus 20, of a mobile communication system 300. Embodiments may further provide a base station transceiver 100 (indicated optionally by broken lines in FIG. 1) comprising an apparatus 10 for said base station transceiver 100. Furthermore, embodiments may provide a mobile transceiver 200 (indicated optionally by broken lines in FIG. 1) comprising an apparatus 20 for said mobile transceiver 200.

The base station transceiver apparatus 10 comprises a transceiver module 12 to communicate with the mobile transceiver 200. The transceiver module 12, and correspondingly the transceiver 22 as will be introduced in the sequel, may be implemented as any means for transceiving, i.e. receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc. The transceiver module 12 is configured to communicate with the mobile transceiver 200 and the transceiver module 22 is configured to communicate with the base station transceiver 100 using at least a first communication channel and a second communication channel. The first communication channel is more reliable than the second communication channel. The reliability of the communication channels may differ in terms of transmission quality of a corresponding radio channel allowing for different error rates, in terms of different access nature, such as circuit switched, packet switched or contention based, or in terms of differing radio resources, such as time, frequency or spatial resources.

The base station transceiver apparatus 10 further comprises a controller module 14 to control the transceiver module 12. In embodiments the control module 14, and correspondingly the control module 24 as will be introduced in the sequel, may be implemented using one or more processing units, one or more processing devices, any means for processing, such as a processor, a computer or a programmable hardware component being operable with accordingly adapted software. In other words, the described functions of the control modules 14, 24 may as well be implemented in software, which is then executed on one or more programmable hardware components. Such hardware components may comprise a general purpose processor, a Digital Signal Processor (DSP), a micro-controller, etc.

As shown in FIG. 1 the transceiver module 12 is coupled to the controller module 14. The controller module 12 is further configured to provide a data service to the mobile transceiver 200. Here and in the following a data service can be understood as a service provided by the mobile communication system 300, e.g. in terms of a bearer service that allows the mobile transceiver to communicate data packets with the mobile communication system 300 or another entity coupled to the mobile communication system 300, such as a server or platform external to the mobile communication system 300. In embodiments the data service comprises first and second data packets. The first data packets comprise information related to core data of the data service and the second data packets comprise information related to optional refinement data for the data service. In embodiments the first data packets use the first communication channel and the second data packets use the second communication channel.

FIG. 1 further illustrates an embodiment of a mobile transceiver apparatus 20 of the mobile communication system 300, which also comprises the base station transceiver 100. The mobile transceiver apparatus 20 comprises a transceiver module 22 to communicate with the base station transceiver 100 using at least a first communication channel and a second communication channel. The first communication channel is more reliable than the second communication channel. With respect to the implementation of the transceiver module 22 it is referred to the above description of the transceiver module 12, where implementations may be adapted to the respective entity, e.g. the mobile transceiver 200 and/or the base station transceiver 100, for example in terms of power, efficiency, resource consumption, bandwidth, etc. The mobile transceiver apparatus 20 further comprises a controller module 24 to control the transceiver module 22. The controller module 24 is coupled to the transceiver module 22. With respect to the implementation of the controller module 24 it is referred to the above description of the controller module 14, where implementations may be adapted to the respective entity, e.g. the mobile transceiver 200 and/or the base station transceiver 100, for example in terms of power, efficiency, resource consumption, bandwidth, etc.

The controller module 24 of the mobile transceiver apparatus 20 is configured to provide a data service to the base station transceiver 100. With respect to the data service it is referred to the above described data service. The data service comprises first and second data packets, wherein the first data packets comprise information related to core data of the data service, and wherein the second data packets comprise information related to optional refinement data for the data service. The first data packets use the first communication channel, and wherein the second data packets use the second communication channel.

In some embodiments the respective controller module 14, 24 provides the respective transceiver module 12, 22 with first data packets, which contain non-optional core data, and second data packets, which contain optional refinement data.

For the following embodiments, all embodiments providing communication from the base station transceiver to the mobile transceiver may also be adapted for communication from the mobile transceiver to the base station transceiver, and vice versa, and are not mutually exclusive. That is to say the following description refers to uplink data transmission, downlink data transmission and/or to both.

The first data packets use the more reliable first channel, and the second data packets use the less-reliable second channel. For example, the mobile transceiver 200 can rely primarily on the reliability-required part of the data packets (first data packets). In case, the mobile transceiver 200 detects the successful availability of corresponding information on the less-reliable channel (second data packets), it combines the two sets of information. Similar considerations apply to uplink transmission at the base station transceiver 100.

In some embodiments an integrated air interface for 5G systems may contain or comprise a frame-structure which has both, resources for scheduled (controlled) access (in terms of the first communication channel) and contention-based (random, non-controlled) access (in terms of the second communication channel), which may both be used for data transmission.

Certain applications or data services with particular source coding (e.g. video), as well as certain signaling mechanisms (like Channel State Information (CSI) reporting), have the property that a certain minimum amount of information should be transmitted reliably via the air interface, while additional information, which is desirable to improve the quality of communication, is not absolutely necessary (thus "nice-to-have"). For the example of video, this additional information could e.g. provide a higher video resolution for real-time video-telephony. In case of CSI reporting, the additional uplink (or downlink) information could be more refined channel knowledge, further improving techniques like downlink interference alignment or network Multiple-Input-Multiple-Output (MIMO) or Coordinated MultiPoint (CoMP) transmission. In the subsequent parts those types of applications or services may also be referred to as Reliable Core plus Optional Refinement (RCOR) services or applications. Embodiments may, for example, make more efficient use of a 5G air interface for those RCOR applications.

For example, in some embodiments additional information through contention-based resources may further improve the efficient use of network resources, increase the quality of service (QoS) and enhance the quality of experience (QoE).

Some embodiments may make use of hierarchical modulations such as in Digital Video Broadcast-Terrestrial (DVB-T). Such modulations may potentially be used on one or even both communication channels. For example, Quadrature Amplitude Modulation (QAM) constellations are built on linear combinations of sub-sets of Quadrature Phase-Shift Keying (QPSK) ones. Some of the QPSK sets are better protected, while others are only received if conditions are favorable. While these constellations may be used on the first communication channel refinement data may be additionally provided on the second communication channel. In some embodiments the data service may correspond to a scalable video data service, wherein the first data packets comprise information related to basic video data, and wherein the second data packets comprise information related to enhancement video data. Embodiments may include resource diversity, namely another set of resources and also another access scheme (i.e. random access) may be used for the transmission of optional parts. This optional information may be additionally protected by this further degree of diversity and no extra energy might be spent on the main part of the transmission for this optional information as in hierarchical constellations. For example, video streaming quality, be it in uplink or downlink, scheduled dedicated resources may be used in embodiments for basic information and contention-based resources, potentially only when under-utilized, may be used to transmit additional refining information for better quality, e.g. video quality.

Some embodiments, e.g. providing RCOR applications on top of 4G systems, may make use of different forward error correction coding. The reliability-required part (first data packets) may be protected by low-rate codes, the optional part (second data packets) may use higher code rates. Then the data transmission for the first data packets may be carried out via scheduled access. Embodiments may provide improved transmission efficiency as the optional part, though potentially using higher code rates, may take away fewer resources for scheduled access, increasing the available throughput for other services. Embodiments may hence use two or more communication channels with, for example, hierarchical modulations such as in Terrestrial Digital Video Broadcast (DVB-T). Embodiments may use contention-based access resources of a 5G air-interface for the optional-refinement part of RCOR applications. The reliability-required part of the RCOR may still be transmitted using scheduled resources, for example multiple access resources in the dimensions time, frequency, code and space.

For the efficient use of less-reliable channels, e.g. contention-based resources, the base station transceiver apparatus 10 may comprise an additional monitoring and management function of the resources and the link quality, for example if the link is in good Signal-to-Interference-and-Noise-Ratio (SINR) conditions. In some embodiments, the controller module 14, 24 of apparatus 10, 20 may be configured to transmit the first and second data packets to the mobile transceiver 200, the base station transceiver 100, respectively. In some embodiments, the second data packets are communicated when a channel quality indicator for the second communication channel indicates a communication quality above a threshold. Such a quality indicator may correspond to a Signal-to-Noise Ratio (SNR), a Signal-to-Interference Ratio (SIR), a SINR, a path loss, an attenuation, etc. Moreover in some embodiments, the controller module 14, 24 may additionally or alternatively be configured to combine the first and second data packets received from the mobile transceiver 200, the base station transceiver 100, respectively, when a reception quality on the second communication channel lies above a threshold. The reception quality may, for example, be determined in terms of a Cyclic Redundancy Check (CRC) or in terms of an error rate determined for the received second data packets.

Conditioned to the outcome of the monitoring function, the optional data parts of the RCOR application may be transmitted (or combined) via the contention-based access resources. The use of contention-based resources may increase the probability of collision, which may cause an increase in the probability of error. However, being the optional-refinement part (second data packets) of RCOR, it can tolerate a higher error rate than the reliable-required part (first data packets). Additionally or alternatively, the first data packets may comprise information related to payload data, and the second data packets may comprise information related to channel state information of the first communication channel. The controller module 14, 24 may also be configured to send the second data packets when a traffic volume on the second data channel is below a threshold. In case the contention-based resources are highly utilized (e.g. for machine type traffic or access requests), the monitoring function may stop the transmission of the optional part or if the information is delay-tolerant, it may also delay the transmission. On the receiver side, the control module 14, 24 may be configured to rely primarily on the reliability-required part (first data packets on the first communication channel) of the RCOR. In case, the receiver detects the successful availability of corresponding information on the contention-based resources (second data packets on the second communication channel), it combines the two sets of information. The additional information through the contention-based resources may further improve the efficient use of network resources, increase the Quality of Service (QoS) and enhance the Quality of Experience (QoE).

Figure 2:
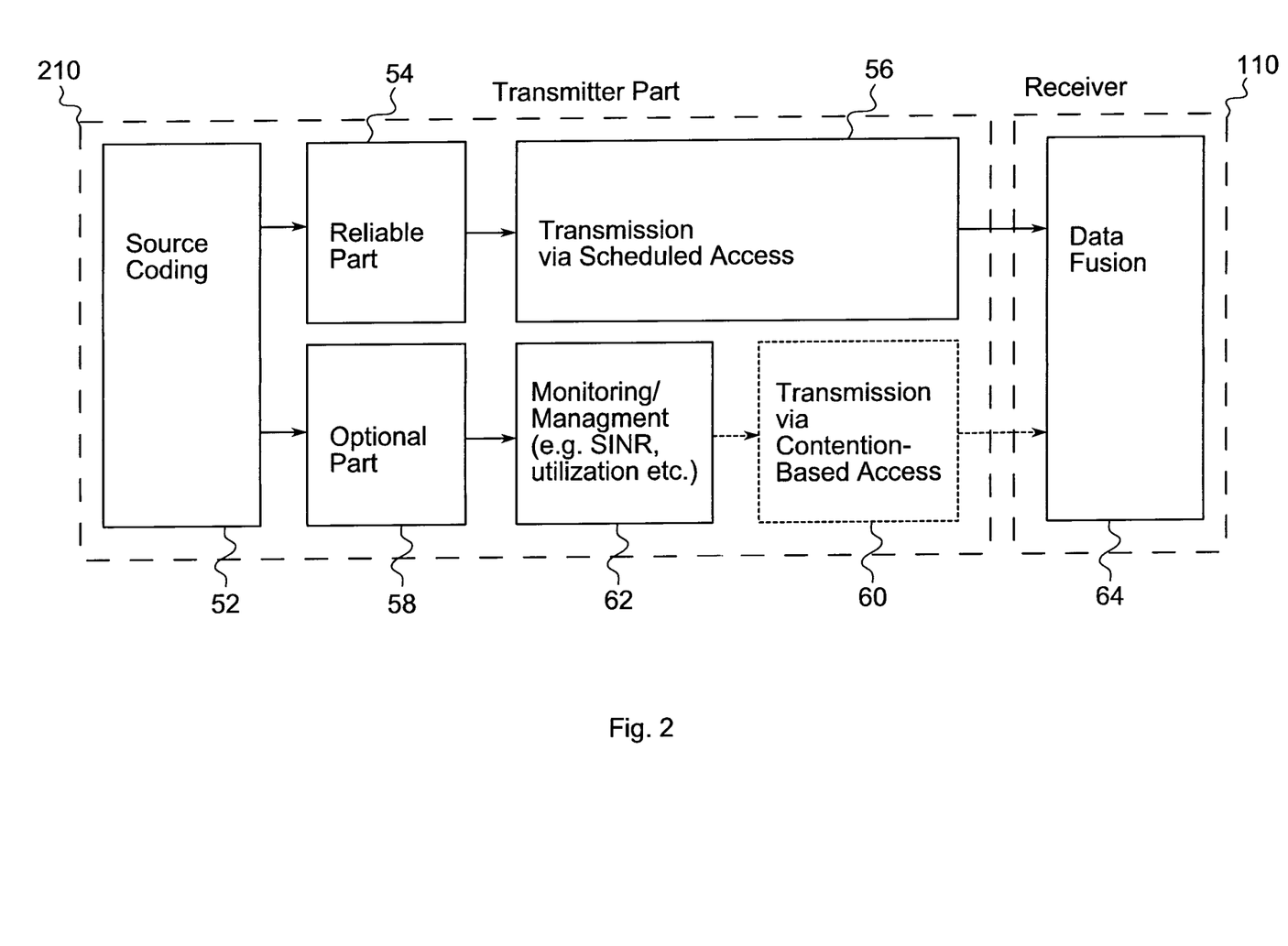
FIG. 2 shows a block diagram of embodiments in an implementation for a transmitter and for a receiver.

FIG. 2 shows a block diagram of embodiments in an implementation for a transmitter 210 and for a receiver 110. In the present embodiment it is assumed that the transmitter is implemented in a mobile transceiver 200 comprising the above-described apparatus 20 and the receiver 110 is implemented in a base station transceiver 100 comprising the above-described apparatus 10. The control modules 14, 24 are configured according to the following description. In principle, a source coding block 52 or the application 52 splits its output into a reliable part 54 (first data packets) and an optional part 58 (second data packets). The former is always transmitted via scheduled access block 56 being mapped to the first communication channel, the latter is transmitted via contention based access block 60 being mapped on the second communication channel if certain conditions are fulfilled, which are monitored by monitoring/management block 62, for example like low current usage status of the contention-based resources. Finally the received data is combined in data fusion block 64 to create the final output of the application.

FIG. 2 shows salient functions present in the transmitter 210 and the receiver 110 in order to realize in an embodiment. At the transmitter 210 side, the source coding 52 divides the information into two parts. The first part 54 which contains the required-reliable information is transmitted through the scheduled resources 56. The second part 58 which contains the optional information is transmitted using the contention-based resources 60 after passing through the monitoring and management function 62. The receiver 110 performs the data fusion 64 of the reliable part with the refining optional information. In some embodiments, additionally, in the scheme depicted in FIG. 2 extra signaling information can be used for the request from the application to use these additional resources.

In some embodiments the second data packets may comprise a priority indicator. Priorities may be distinguished for second data packets of different data services or for different users. The controller module 14, 24 may be configured to transmit the second data packets when a channel priority level indicator for the second communication channel allows transmission of data packet with the priority indicator. Hence, an indication may be provided by a receiver, e.g. a base station transceiver 100, indicating a priority level for transmission of second data packets such that second data packets of a lower priority might not be transmitted while second data packets of a higher priority may transmitted. Embodiments may provide a priority based admission control for the second communication channel.

In some embodiments, the second communication channel may be a contention based communication channel. The first communication channel may be a scheduled communication channel.

In another embodiment with a first channel for scheduled access and a second channel for contention-based access, the mobile station mobile transceiver 200 reports the core-part of its channel state information on scheduled dedicated resources (in a Long Term Evolution (LTE) Physical Uplink Control CHannel (PUCCH)-like fashion). In case the mobile transceiver 200 detects that the contention-based part of the frame structure is underutilized and the mobile transceiver 200 is in good SINR conditions, the mobile transceiver 200 reports as well refining channel state information via the contention-based second channel, improving the quality of channel knowledge when combined with the regular channel state information report.

As an example in an embodiment, the main steps in a Multiple Input Multiple Output (MIMO) system for the Precoding Matrix Indicator (PMI) reporting are described, PMI being an example for the more general channel state information term used throughout this application. It is assumed that a hierarchical feedback scheme, cf. for example the above cited M. Trivellato et al, is employed with two levels: $B_1$ bits are used for the first level, hence the first level codebook $C_1$ has $2^{B_1}$ codewords, whereas $B_2$ bits are used for the second level, hence there are $2^{B_1}$ second level codebooks $C_{2,t}$, t=0, 1, . . . , $2^{B_1}-1$, each with $2^{B_2}$ codewords. Second level codebooks are designed to refine the information given by the first level codebook. In an embodiment the first level codebook data may be transmitted as part of the first data packets and the second level codebook data may be transmitted as part of the second data packets. In an embodiment

- The mobile transceiver 200 estimates the MIMO channel connecting itself to its serving base station transceiver 100.
- The mobile transceiver 200 quantizes the MIMO channel by employing the hierarchical codebook described above, i.e., the mobile transceiver 200 selects the best codeword x in the first level codebook $C_1$ and the best codeword y in the related second level codebook $C_{2,t}$.
- The mobile transceiver 200 feeds back to the base station transceiver 100 the $B_1$ bits representing the codeword x by using the scheduled resources, i.e. the first data packets communicated on the first communication channel.
- If the contention-based second channel is underutilized, the mobile transceiver 200 feeds back to the base station transceiver 100 the $B_2$ bits representing the codeword y by using the second data packets communicated on the contention-based second channel.
- The station transceiver 100 detects the $B_1$ bits received on the scheduled first channel and the $B_2$ bits received on the contention based second channel. If there was a collision on the contention-based second channel, the base station transceiver 100 computes the codeword x based only on the $B_1$ bits received on the scheduled resources. If there was no collision on the contention based second channel, the base station transceiver 100 computes the codeword y based on all the $B_1+B_2$ bits received from the mobile transceiver 200.

In some embodiments, a second channel may be used for additional control signaling exchange. To use a contention based second communication channel, the base station transceiver 100 may either broadcast in the common control channel the information of which contention based channel can be used as second channel for the transmission of additional information (second data packets). Furthermore, information regarding the contention as the retransmission probability, or transmission format/power can be included. Or the second channel is determined on a case by case basis, where a specific application requests via downlink an operation mode to be assigned a second channel for optional data, e.g. RCOR. The base station transceiver 100 then grants and sends the resource/operation information via downlink.

In some embodiments the control module may be configured to provide the data service, wherein the data service corresponds to downlink video traffic, which is a major part of the total traffic in current cellular networks. Delivery of video content in downlink to the mobile users with a high Quality of Experience (QoE) may be considered a challenge. For this purpose, context aware resource allocation may be used to improve the QoE and the radio resource management. The resource allocation algorithms in embodiments in the controller module 14 of the base station transceiver apparatus may use the context information to improve the buffer control and resource allocation, cf. the above cited M. Draexler et al and S. Sadr et al. However, due to the limited resources in uplink not all the available context information can be transmitted. In case of a mobile user, location updates play an important role in the prediction of the link quality. Usually the Global Positioning System (GPS) location updates are not used due to the limited amount of uplink resources. Instead the network estimates the coarse locations with the help of location estimation algorithms. A contention-based second communication channel may be used to deliver the location updates. This information may be used directly by the resource allocation algorithms, it may aid the location estimation algorithms and it may also be used for the route prediction. This information may also help to improve the mobility management in the network. In principle, context may be any type of information, e.g. geoinformation, speed of user, user-equipment capability, application level information etc. Most of the context information are nice to have and used optionally by the network. Hence in a broad sense all the optional context information may be transmitted using the contention-based second channel.

Methods in embodiments may be exploited by any application with delay constraints and relying on hierarchical-kind of information, by using the scheduled dedicated resources (first communication channel) for the core-required information and the contention-based resources (second communication channel) for the optional refining information.

Figure 3:
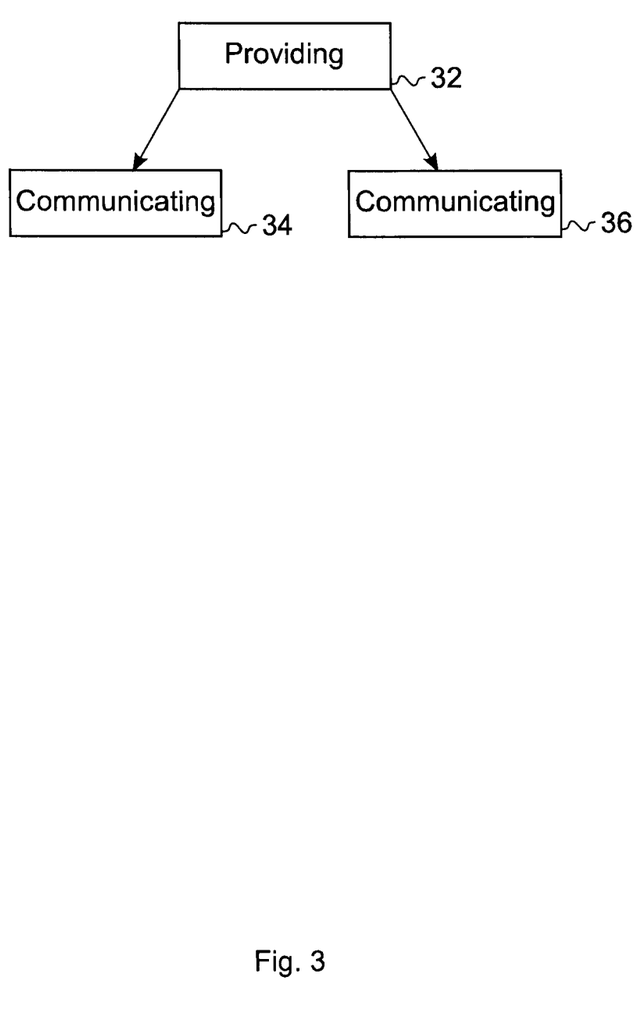
FIG. 3 shows a block diagram of a flow chart of an embodiment of a method for a base station transceiver in a mobile communication system.

FIG. 3 shows a block diagram of a flow chart of an embodiment of a method for a base station transceiver 100 of a mobile communication system 300 further comprising a mobile transceiver 200. The method comprises providing 32 a data service to the mobile transceiver 200. The data service comprises first and second data packets, wherein the first data packets comprise information related to core data of the data service, and wherein the second data packets comprise information related to optional refinement data for the data service. The method also comprises communicating 34 with the mobile transceiver 200 the first data packets using a first communication channel as well as communicating 36 with the mobile transceiver 200 the second data packets using a second communication channel, wherein the first communication channel is more reliable than the second communication channel.

Figure 4:
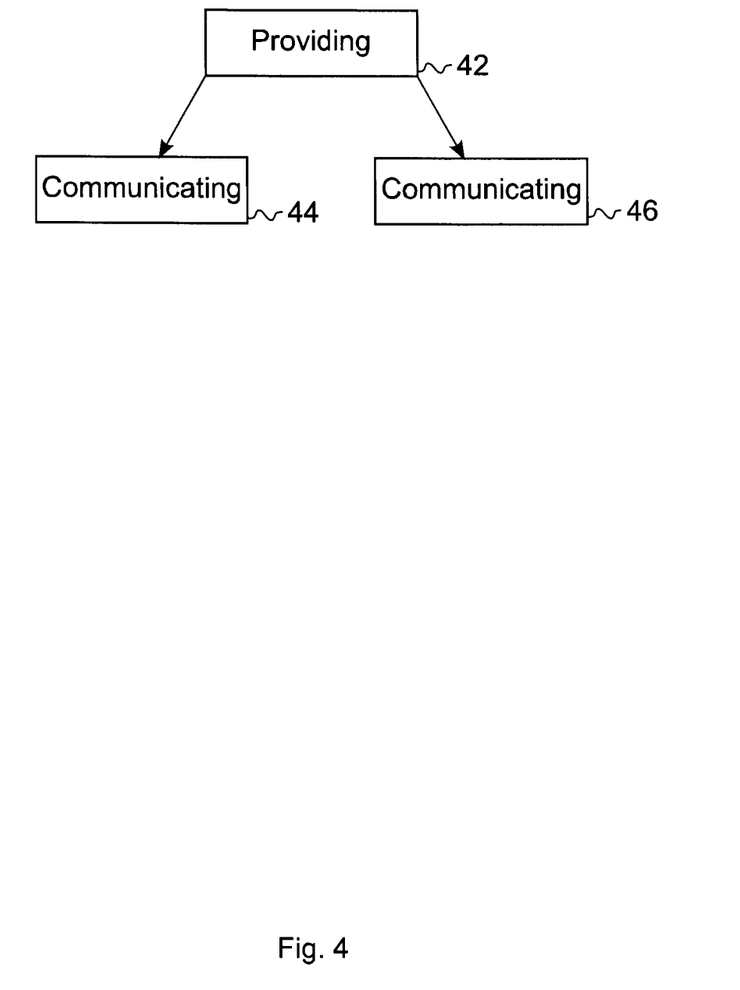
FIG. 4 shows a block diagram of a flow chart of an embodiment of a method for a mobile transceiver in a mobile communication system.

FIG. 4 shows a block diagram of a flow chart of an embodiment of a method for a mobile transceiver 200 of a mobile communication system 300 further comprising a base station transceiver 100. The method comprises providing 42 a data service to the base station transceiver 100. The data service comprises first and second data packets, wherein the first data packets comprise information related to core data of the data service, and wherein the second data packets comprise information related to optional refinement data for the data service. The method also comprises communicating 44 with the base station transceiver 100 the first data packets using a first communication channel as well as communicating 46 with the base station transceiver 100 the second data packets using a second communication channel, wherein the first communication channel is more reliable than the second communication channel.

Some embodiments comprise a digital control circuit installed within the apparatus for performing the method. Such a digital control circuit, e.g. a Digital Signal Processor (DSP), needs to be programmed accordingly. Hence, yet further embodiments also provide a computer program having a program code for performing embodiments of the method, when the computer program is executed on a computer, a digital processor, or a programmable hardware component. A further embodiment is a computer readable storage medium storing instructions which, when executed by a computer, processor, or programmable hardware component, cause the computer to implement one of the methods described herein.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F) PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", "means for controlling", "means for transmitting", "means for receiving", "means for transceiving", "means for processing", etc., may be provided through the use of dedicated hardware, such as "a controller", "a transmitter", "a receiver", "a transceiver", "a processor", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

The invention claimed is:

1. An apparatus for a base station transceiver of a mobile communication system, the mobile communication system further comprising a mobile transceiver, the apparatus comprising a transceiver configured to communicate with the mobile transceiver using at least a first communication channel and a second communication channel, wherein the first communication channel is more reliable than the second communication channel; and a controller configured to control the transceiver and to provide a data service to the mobile transceiver, wherein the data service comprises first and second data packets, wherein the first data packets comprise information related to core data of the data service, and wherein the second data packets comprise information related to optional refinement data for the data service, wherein the first data packets use the first communication channel, and wherein the second data packets use the second communication channel, and wherein an access nature of the first communication channel is different from an access nature of the second communication channel.

2. The apparatus of claim 1, wherein the controller is configured to transmit the first and second data packets to the mobile transceiver wherein the controller is configured to communicate the second data packets when a channel quality indicator for the second communication channel indicates a communication quality above a threshold, and/or wherein the controller is configured to receive the first and second data packets from the mobile transceiver and wherein the controller is configured to combine the first and second data packets received from the mobile transceiver when a reception quality on the second communication channel lies above a threshold.

3. The apparatus of claim 1, wherein the data service corresponds to a scalable video data service, wherein the first data packets comprise information related to basic video data, and wherein the second data packets comprise information related to enhancement video data.

4. The apparatus of claim 1, wherein the first data packets comprise information related to payload data, and wherein the second data packets comprise information related to channel state information of the first communication channel.

5. The apparatus of claim 1, wherein the controller is configured to communicate the second data packets when a traffic volume on the second data channel is below a threshold, and/or wherein the second data packets comprise a priority indicator, and wherein the controller is configured to communicate the second data packets when a channel priority level indicator for the second communication channel allows transmission of data packet with the priority indicator.

6. The apparatus of claim 1, wherein the second communication channel is a contention based communication channel, and/or wherein the first communication channel is a scheduled communication channel.

7. An apparatus for a mobile transceiver of a mobile communication system, the mobile communication system further comprising a base station transceiver, the apparatus comprising a transceiver configured to communicate with the base station transceiver using at least a first communication channel and a second communication channel, wherein the first communication channel is more reliable than the second communication channel; and a controller configured to control the transceiver and to provide a data service to the base station transceiver, wherein the data service comprises first and second data packets, wherein the first data packets comprise information related to core data of the data service, and wherein the second data packets comprise information related to optional refinement data for the data service, wherein the first data packets use the first communication channel, and wherein the second data packets use the second communication channel, and wherein an access nature of the first communication channel is different from an access nature of the second communication channel.

8. The apparatus of claim 7, wherein the controller is configured to transmit the first and second data packets to the base station transceiver wherein the controller is configured to communicate the second data packets when a channel quality indicator for the second communication channel indicates a communication quality above a threshold, and/or wherein the controller is configured to receive the first and second data packets from the base station transceiver and the controller is configured to combine the first and second data packets received from the base station transceiver when a reception quality on the second communication channel lies above a threshold.

9. The apparatus of claim 7, wherein the data service corresponds to a scalable video data service, wherein the first data packets comprise information related to basic video data, and wherein the second data packets comprise information related to enhancement video data.

10. The apparatus of claim 7, wherein the first data packets comprise information related to payload data, and wherein the second data packets comprise information related to channel state information of the first communication channel.

11. The apparatus of claim 7, wherein the controller is configured to communicate the second data packets when a traffic volume on the second data channel is below a threshold, and/or wherein the controller is configured to communicate the second data packets when a channel priority level indicator for the second communication channel indicates a priority level, above which messages characterized on a priority scale may be transmitted on the second communication channel.

12. The apparatus of claim 7, wherein the second communication channel is a contention based communication channel, and/or wherein the first communication channel is a scheduled communication channel.

13. A method for a base station transceiver of a mobile communication system, the mobile communication system further comprising a mobile transceiver, the method comprising
providing a data service from the base station transceiver to the mobile transceiver, wherein the data service comprises first and second data packets, wherein the first data packets comprise information related to core data of the data service, and wherein the second data packets comprise information related to optional refinement data for the data service,
communicating the first data packets from the base station transceiver to the mobile transceiver using a first communication channel; and
communicating the second data packets from the base station transceiver to the mobile transceiver using a second communication channel,
wherein the first communication channel is more reliable than the second communication channel, and wherein an access nature of the first communication channel is different from an access nature of the second communication channel.

14. A method for a mobile transceiver of a mobile communication system, the mobile communication system further comprising a base station transceiver, the method comprising
providing a data service from the mobile transceiver to the base station transceiver, wherein the data service comprises first and second data packets, wherein the first data packets comprise information related to core data of the data service, and wherein the second data packets comprise information related to optional refinement data for the data service,
communicating the first data packets from the mobile transceiver to the base station transceiver using a first communication channel; and
communicating the second data packets from the mobile transceiver to the base station transceiver using a second communication channel,
wherein the first communication channel is more reliable than the second communication channel, and wherein an access nature of the first communication channel is different from an access nature of the second communication channel.

15. A non-transitory computer-readable medium storing program instructions, that when executed by a computer, a processor, or a programmable hardware component cause the base station transceiver to perform the method of claim 13.

16. A non-transitory computer-readable medium storing program instructions, that when executed by a computer, a processor, or a programmable hardware component cause the mobile transceiver to perform the method of claim 14.

17. The method of claim 13, wherein the second data packets are communicated from the base station transceiver to the mobile transceiver when a traffic volume on the second data channel is below a threshold.

18. The method of claim 13, wherein the second data packets comprise a priority indicator and the second data packets are communicated from the base station transceiver to the mobile transceiver when a channel priority level indicator for the second communication channel allows transmission of data packets with the priority indicator.

19. The method of claim 14, wherein the second data packets are communicated from the mobile transceiver to the base station transceiver when a traffic volume on the second data channel is below a threshold.

20. The method of claim 14, wherein the second data packets are communicated from the mobile transceiver to the base station transceiver when a channel priority level indicator for the second communication channel indicates a priority level above which messages characterized on a priority scale may be transmitted on the second communication channel.

* * * * *